May 21, 1940.　　　A. D. ROBINSON　　　2,201,455
INK DISPENSING DEVICE
Filed June 6, 1938
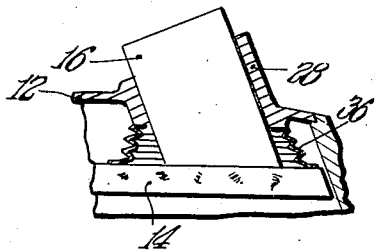
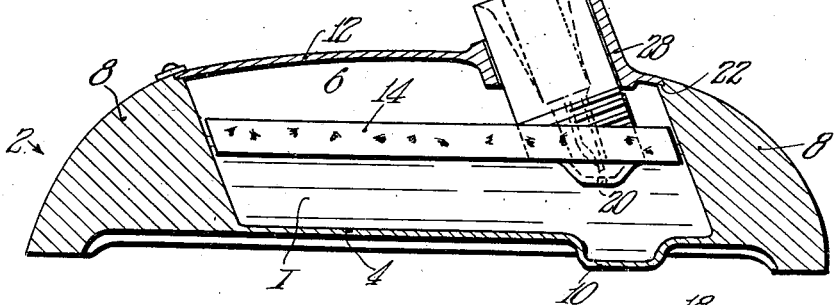
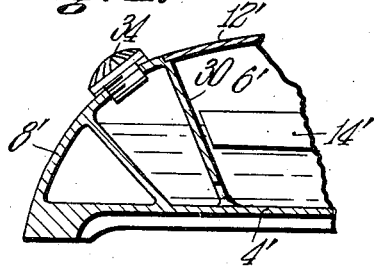
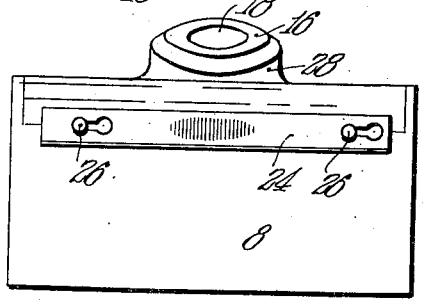
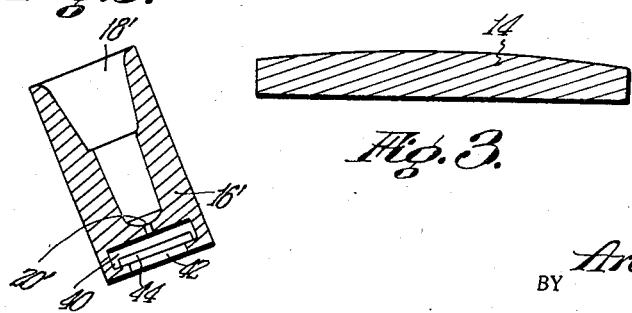
INVENTOR.
Archie D. Robinson.
BY
Walter C. Ross
ATTORNEY.

Patented May 21, 1940

2,201,455

UNITED STATES PATENT OFFICE 2,201,455

INK DISPENSING DEVICE

Archie D. Robinson, Westfield, Mass.

Application June 6, 1938, Serial No. 212,097

5 Claims. (Cl. 120—71)

This invention relates to improvements in dispensing devices and is directed more particularly to devices for novelly and efficiently dispensing such fluids as ink.

It is one of the principal objects of the invention to provide an ink well which is so constructed and arranged that a pen supported thereby has its pen point submerged in the ink a predetermined distance at all times irrespective of the level of the ink. This is desirable not only in order that the point be kept relatively moist but so that the proper amount of ink, no more and no less, is automatically supplied to the pen.

Still another object of the invention is the provision of an ink well construction wherein a pen-holding means automatically follows the level of the ink. That is to say, as the level rises, as it does when filling the well, the holding means rises and when the level lowers as the supply becomes exhausted, the holding means lowers.

In this way, the ink does not tend to ride up on the pen-holder and consequently cause soiling of the fingers nor does the ink level become such that the point does not receive the proper amount of ink. In other words, at all times the pen point is properly submerged and this is all accomplished without the bother of manual adjustment of parts or the soiling of either fingers or the holder as is inevitable with most ink-wells heretofore known.

Various other features and advantages of the invention will become more apparent after a reading of the following description and reference will be had to the accompanying drawing, wherein:

Fig. 1 is a sectional view through a device embodying the features of the invention;

Fig. 2 is an end elevational view of the device shown in Fig. 1;

Fig. 3 is a transverse sectional view through one of the elements later to be described;

Fig. 4 is a partial sectional view to show a modified form of one end of the device shown in Fig. 1;

Fig. 5 is a partial sectional view to explain certain other modifications of the invention; and Fig. 6 is a partial sectional view to explain certain other modifications of the invention.

Referring now to the drawing more in detail, the invention will be fully described.

A receptacle indicated generally by 2 is provided and while this may vary greatly as to shape and form, it includes a bottom wall 4, side walls 6, and end walls 8. Preferably the lower wall 4 is formed to have a sump 10 for a purpose which will later appear.

The receptacle 2 has an open upper side which is adapted to be closed by an upper wall member 12. The manner of associating the member 12 with the receptacle will vary depending upon the form and shape of the receptacle, as well as upon other considerations which will be described.

Means for supporting a pen holder is provided and this includes a member 14 adapted to follow the level of the ink automatically as it rises and falls. In the form at present preferred the member 14 consists of a float formed of cork. Such material, of course, is adapted to be supported by the fluid. However, the member 14 may be otherwise formed, such as a hollow, metallic tank or the like.

In any event, the member 14 carries a pen-holding member 16 which is preferably in the form of a socket part such as shown in Fig. 1. The parts 16 has a bore 18, preferably tapering downwardly more or less as shown to a restricted opening 20 at its lower end.

The arrangement is such that the ink, indicated by I, seeps into the opening 20 so as to reach its own level within the socket 16. Thus a pen-holder, such as P, shown with the usual pen-point associated therewith, may be supported by the holding means with the point in the ink contained in the bore 18.

The upper wall member 12 is preferably removable so that the member 14 may be disposed within the receptacle during its manufacture. While I find it desirable that the wall 12 not be permanently attached so as to facilitate cleaning of the well, and even filling of the same, it may be adhesively or otherwise permanently secured in place.

In the form shown, however, I provide a groove 22 in one of the end walls 8 and into this I introduce one end edge of the wall 12. The opposite end thereof may be held down by any suitable means such as a slotted plate 24 movable relative to pins 26 carried by the receptacle. A screw or screws or other temporary fastening means may obviously be employed.

In any event, the upper wall 12 is provided with an opening for receiving the part 16 so that the pen may be inserted therein in the usual way. Preferably there is a socket part 28 associated with wall 12 through which the part 16 extends, as shown. If desired, too, the socket member 16 may be screw-threaded into the float member, as shown, so as to facilitate its removal for cleaning purposes.

It will be appreciated that as the ink level rises or falls, the member 14 rises or falls automatically, carrying with it part 16 which moves up and down within member 28. The pen supported by the holder 16, of course, likewise moves as the latter moves so that the pen point is at all times submerged in the ink to the same extent in all positions of the float 14.

It is desirable, of course, that the float be substantially on a level and it is also desirable that the pen be supported more or less at an angle relative to the well as shown for purposes of convenience in inserting and withdrawing the pen. It is therefore obvious that the holding means must be so located relative to the float proper that neither the socket member 16 alone nor the socket and the pen together will unbalance the float.

Accordingly, I find that if the holder is associated with the float adjacent one end thereof, or at least at one side of the center thereof, with the pen extending angularly towards that end with which the socket is associated, the whole pen-supporting means is properly balanced and automaticaly and efficiently follows the level of the ink without difficulty.

It will be noted that the sump 10 is so located that when the ink level is considerably low, the ink in the sump may still be supplied to the pen point.

It is also desirable, as shown in Fig. 3 to have the upper surface of member 14 curved convexly as shown. This is so that ink does not tend to remain on top of the same and interfere with the buoyancy thereof but, rather, flows off the sides thereof.

As stated, according to the form shown in Fig. 1, the upper wall 12 is removable. This is both to facilitate positioning of the float and its associated parts during manufacture and to permit introduction of a new supply of ink into the well.

However, it may be desirable to provide a separate means for filling the well such as shown in Fig. 4. Here, the receptacle includes a bottom wall 4', side wall 6', and end wall 8'. Cover member 12' may or may not be permanently secured.

A transverse partition 30 extends between the side walls 6' adjacent the end wall and this is spaced from the bottom wall, as shown, or has an opening therethrough in communication with the receptacle proper. An opening in the end wall, capped by a removable member 34, is for introducing ink into the receptacle, the opening being, of course, above the normal level of the ink.

It is one of the special features of this invention that the receptacle may be formed to be relatively elongated and low-lying, as contrasted with the substantially high and bulky wells now in use. Such a formation as I provide has the advantage of looking better on a desk or the like and it is, of course, easier to insert and withdraw the pen from a low well than from a high one.

The part 28 of the upper wall or cover member is adapted, it will be clear, to serve as a guide for the holding means as the latter moves up and down. It not only steadies the same in its normal up and down movements but prevents any appreciable rocking of the pen-support when the pen is dropped into the holder.

If desired, there may be associated with the part 16 a seal of some kind which extends between the float and the cover member. An extensible diaphragm such as shown at 36 in Fig. 5 is one way of accomplishing this and such may be formed of various materials, soft rubber, sheet copper or the like.

Any seal which thus surrounds the member 16 between parts 14 and 28 may prevent ink from ever going up into the space between socket 16 and member 28. While in ordinary operation such preventive means is not necessary, it safeguards against any upsurge of ink should one throw the pen into the holder with more than usual force so as to result in violent disturbance of the ink by the pen-holding means.

In Fig. 6 I have shown a modified form of the pen-holding means construction. A socket member 16', similar to the member 16, has an upper bore 18' and a lower restricted opening 20'.

A relatively low and elongated chamber 40 is disposed below the opening 20' and in communication therewith. Leading downwardly from chamber 40 is an opening 42 which is restricted so as to form a flange on the bottom of the chamber as shown. A flat relatively thin valve member such as 44 is disposed within the chamber.

The parts are so arranged that sufficient ink seeps past the valve member into the upper bore so that the pen point is sufficiently submerged. When the pen is thrust more or less violently into the holder, however, the valve member is urged upwardly to close opening 20' and prevent a sudden upsurge of ink.

While I have described the invention in great detail and with respect to the present preferred form thereof, it is not desired to be limited thereto since many changes and modifications may be made therein without departing from the spirit and scope of the invention. What it is desired to claim and secure by Letters Patent of the United States is:

1. An ink well comprising in combination, a receptacle for ink having an opening in its upper side, a closure member overlying said opening and provided with an aperture, a normally horizontally-disposed float member entirely within said receptacle and automatically movable up and down therein in horizontal planes as the level of the ink therein rises and falls, a tubular socket member extending upwardly from said float member through said aperture and movable up and down as said float member moves, said socket member being adapted to receive and support a pen inserted from without said receptacle, and guide means around said aperture for guiding said socket member as it moves with the float member.

2. An ink well comprising in combination, a receptacle for ink having an opening in its upper side, a closure member overlying said opening and provided with an aperture, a normally horizontally-disposed float member entirely within said receptacle and automatically movable up and down therein in horizontal planes as the level of the ink therein rises and falls, a tubular socket member having its lower end threadedly engaged with said float member and extending upwardly therefrom through said aperture, said socket member being movable up and down as said float member moves up and down and being adapted to receive and support a pen inserted from without said receptacle, and guide means around said aperture for guiding said socket member as it moves with the float member.

3. An ink well comprising in combination, a receptacle for ink having an opening in its upper side, a closure member overlying said opening and provided with an aperture therethrough at one side of its center, a normally horizontally-disposed float member entirely within said receptacle and automatically movable up and down therein in horizontal planes as the level of the ink therein rises and falls, a tubular socket member extending upwardly from said float member through said aperture and movable up and down as said float member moves, said socket member inclining at an angle to the float member towards the other side of said center of the closure member and being adapted to receive and support a pen inserted from without said receptacle, and guide means around said aperture inclining in the same direction as said socket member for guiding the latter as it moves with the float member.

4. An ink well comprising in combination, a receptacle for ink having an opening in its upper side, a closure member overlying said opening and provided with an aperture therethrough, a normally horizontally-disposed float member entirely within said receptacle and automatically movable up and down therein in horizontal planes as the level of the ink therein rises and falls, a tubular socket member extending upwardly from said float member through said aperture and movable up and down as said float member moves, said socket member being adapted to receive and support a pen inserted from without said receptacle, a sealing member around said socket member and extending between the upper side of said float member and the lower side of said closure member, and guide means around said aperture for guiding said socket member as it moves with the float member.

5. An ink well comprising in combination, an elongated receptacle for ink having an opening in its upper side adjacent one end thereof, a normally horizontally-disposed elongated float member entirely within said receptacle and automatically movable up and down therein in horizontal planes as the level of the ink therein rises and falls, and a socket member extending upwardly from said float member adjacent the corresponding end thereof and extending through said opening, said socket member inclining in the direction of the other end of said float member and being adapted to receive and support a pen inserted from without said receptacle.

ARCHIE D. ROBINSON.